July 5, 1927.

J. H. WILSON

WINDMILL

Original Filed March 17, 1924    3 Sheets-Sheet 1

1,634,926

WITNESSES

INVENTOR
John H. Wilson
BY
ATTORNEYS

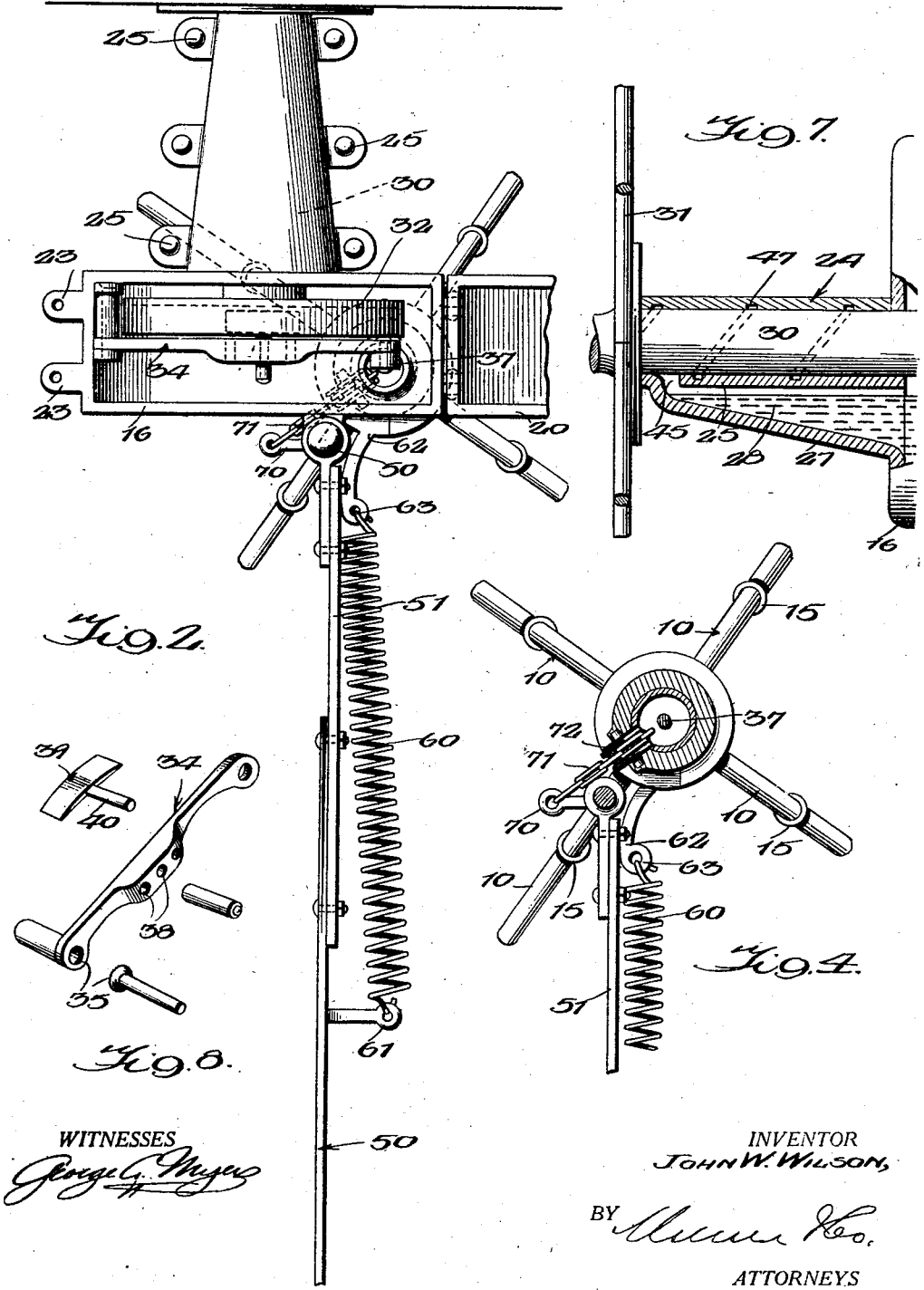

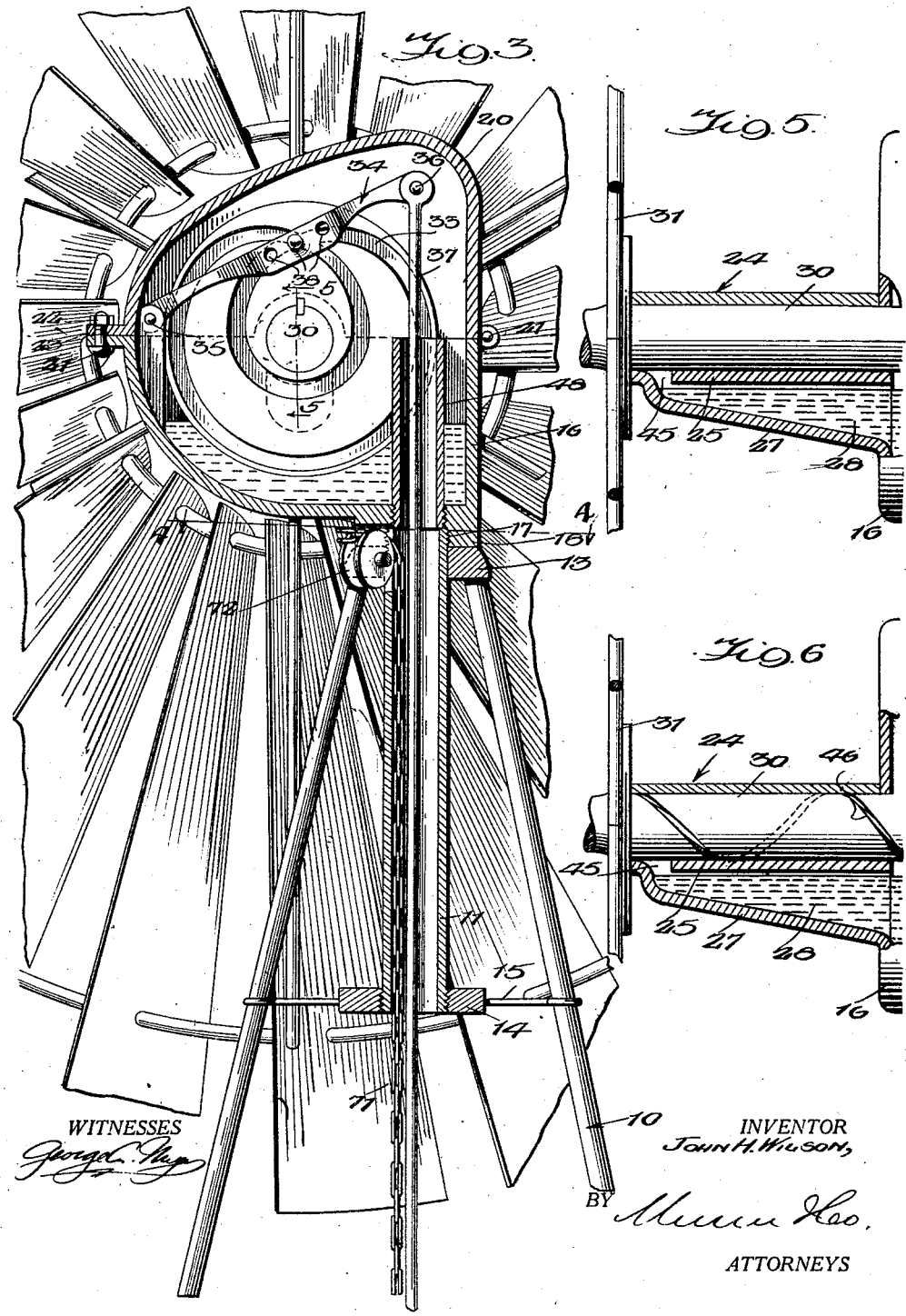

Patented July 5, 1927.

1,634,926

UNITED STATES PATENT OFFICE.

JOHN H. WILSON, OF MITCHELL, NEBRASKA, ASSIGNOR, BY MESNE ASSIGNMENTS, TO JAMES T. WHITEHEAD, OF MITCHELL, NEBRASKA.

WINDMILL.

Application filed March 17, 1924, Serial No. 699,916. Renewed April 27, 1927.

The object of the invention is to provide a wind mill wherein the motion of the wind wheel is smoothly and evenly transmitted to the plunger rod or pump rod without jerking the parts or subjecting the same to sudden shocks or strains thereby prolonging the life of the mechanism and providing for more efficient operation.

Another object is to provide a wind mill of this character and having these advantages and capacities and yet generating an ample degree of power to enable the wind mill to accomplish its intended purposes in an efficient manner.

Another object is to provide a wind mill of this character and in which the wind wheel is automatically held head in the wind at all times except when the velocity of the wind is such as to speed up the movements of the mechanism unduly whereupon the wind wheel is gradually and smoothly, though automatically, shifted around into such position as not to be actuated by the wind.

A further object is to provide a novel and simple means for manually shifting the wind wheel to inoperative position.

A still further object is to provide novel and effective means for protecting and lubricating the mechanism of the wind mill so as to prolong the life of the same.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 2 is a plan view thereof;

Figure 3 is a view in vertical section on line 3—3 of Figure 2;

Figure 4 is a view in horizontal section, on line 4—4 of Figure 3, looking in the directions of the arrows;

Figure 5 is a detail view in vertical section, on line 5—5 of Figure 2;

Figure 6 is a view similar to Figure 5 but showing a slightly modified construction;

Figure 7 is a view similar to Figures 5 and 6 but showing a still further modified construction; and Figure 8 is a group view, in perspective, of the lever, cam follower and associated parts.

Figure 1:
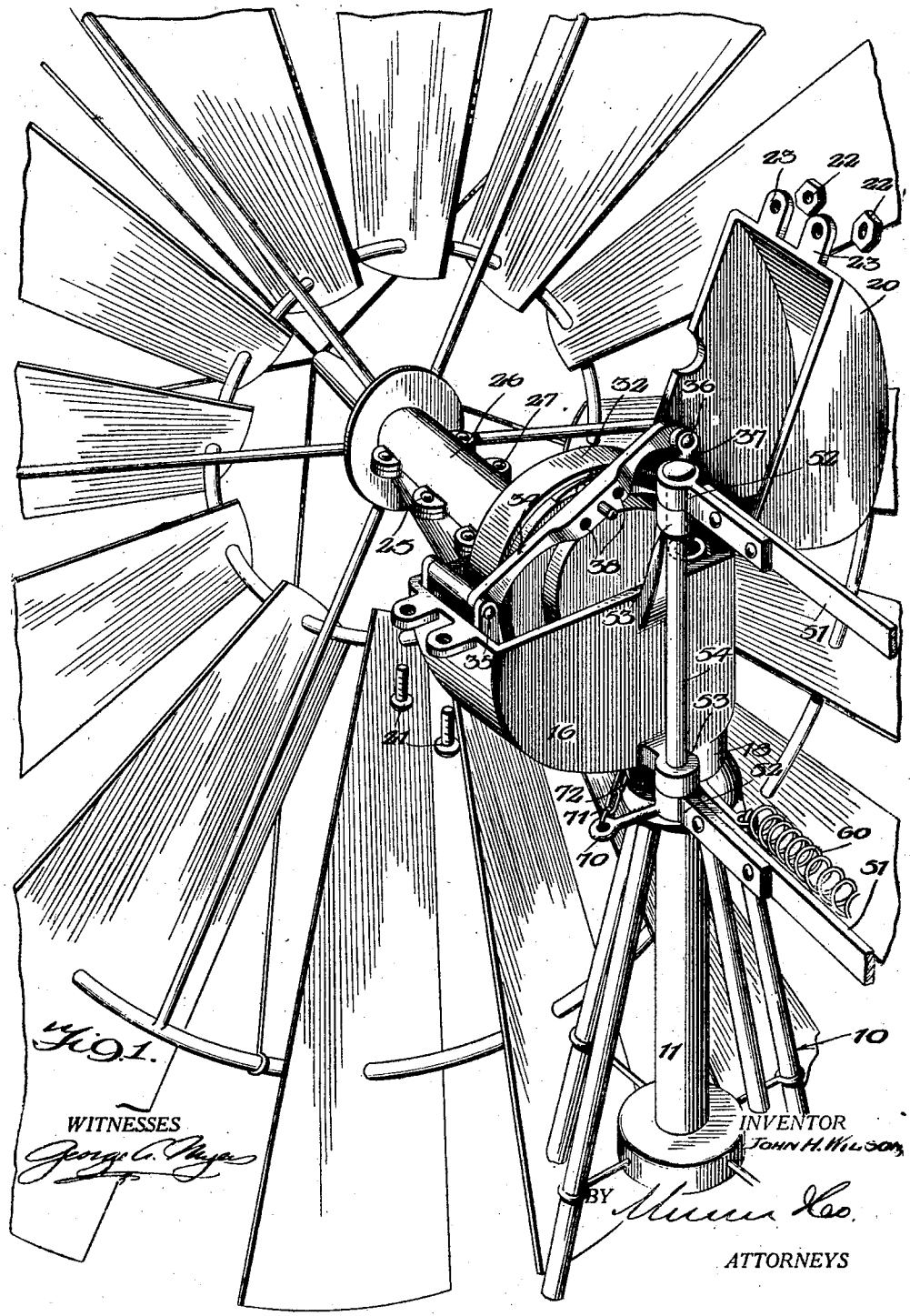
Figure 1 is a fragmentary perspective view, showing a wind mill embodying the present invention.

Referring to the drawings, the numeral 10 designates a tower or derrick which may be of any conventional construction and which includes a depending tubular casing 11 projecting above the top plate 13 of the tower. The tubular casing 11 is rotatably mounted in the top plate and in a guide plate 14 supported as at 15 on the tower.

A housing 16 is provided and is pivotally mounted on the top plate 13 of the tower. To effect this pivotal mounting the tubular member 11 may be threaded into or otherwise connected with the casing 16, as indicated at 17 in Figure 2. Preferably the tubular member 11 is connected to the casing adjacent one corner thereof and the position of the casing to which it is connected is enlarged or provided with a bearing boss 18. With this arrangement the housing is mounted on the tower for swinging movement about a vertical axis offset from the center of the housing. A cover 20 is provided for the housing 16 and is hingedly connected, as at 21, to one side of the housing. In the assembly the cover is bolted down on the housing by means of bolts 21 and nuts 22 which coact with ears 23 formed on the housing 16 and cover 20 to provide a complete enclosure for the mechanism contained within the housing.

The forward portion of the housing is formed with an integral bearing member designated generally at 24. The bearing member 24 is horizontally disposed and includes a bearing proper 25 completed by a removable top 26 bolted, as at 27, to the bearing member proper. Below the bearing member proper a hollow enlargement 27 is formed and defines an enlarged return chamber 28 for the lubricant, as will hereinafter be more fully described. A horizontal shaft 30 is rotatably mounted in the bearing 24, and at its outer end the shaft 30 has fixed thereto a wind wheel 31. The inner end of the shaft is located within the housing 16 and to this inner end a cam 32 is fixed. The cam 32 takes the form of a disk and has its exposed face provided with a double cam groove 33. A lever 34 is fulcrumed, as at 35, on the housing so that the lever is swingable in a vertical plane and about a horizontal axis, the plane in which the lever is swingable being slightly spaced from and parallel to the exposed and grooved face of the cam. The opposite end of the lever 34 from that fulcrumed on the housing is suitably connected, as indicated at 36, to the plunger or pump rod 37. Intermediate its ends the lever 34 is formed with a series of bearing openings 38. A cam follower, designated generally at 39, is provided and operates in the double groove 33 of the cam 32. This follower 39 is formed with an integral stud 40 adapted to be selectively journaled in any one of a series of bearing openings 38. The provision of the series of openings 38 enables the follower to be shifted along the lever 34 and thus provides a means whereby the stroke of the plunger or plumb rod may be varied. The cam and lever in the relation and in the organization specified transmit the motion from the wind wheel shaft 30 to the plunger rod 37 in a smooth and even manner and relieves the parts of sudden shocks, strains or jerks. Moreover the mechanism is extremely simple.

As has been indicated the mechanism thus described operates in an entirely closed housing. In this housing a level of oil is maintained and in order to render the housing oil tight gaskets are interposed between the cover 20 and the housing 16 and between the movable top 26 and the bearing member proper 25. Thus the parts work in oil, and the cam 32 carries the oil up to the shaft 30. The oil works along the shaft to properly lubricate the bearing 24. Adjacent the outer end of the bearing 24 an opening 45 is provided so that the oil fed out along the shaft 30 flows readily into the return chamber 28 and thence back into the housing 16 since the lower end of the chamber 28 is in open and free communication with the housing 16.

If it is desired to increase the feed of oil along the shaft 30 a spiral groove, designated at 46 may be provided in the shaft as illustrated in Figure 6 or a spiral groove designated at 47 may be provided in the bearing member 24, as illustrated in Figure 7.

As shown in Figure 3 a stand pipe 48 is provided in the casing or housing 16 as a continuation of the member 11 in order to make it possible to maintain the desired level of oil within the housing.

A controlling vane, designated generally at 50, is pivotally or hingedly connected to the housing 16. The vane 50 is carried by a pair of bars 51 which have pivot ears 52 at their ends. The ears 52 are alined with similar ears 53 provided on the housing 16, and through the alined ears a pivot pin or bolt 54 is inserted and secured. It will be noted from an inspection of Figure 2 that the shaft 30 is located approximately centrally of the housing 15, and that the pivot bolt 54 is located midway or half-way between the axis of the shaft 30 and the axis of rotation of the housing 16.

Yieldable means is provided for normally maintaining the vane 50 in a plane parallel to the axis of the shaft 30. This means preferably consists of a retractile coil spring 60 having one end secured, as at 61, to the vane and having its opposite end secured to the outer end of the lug 62, as indicated at 63. The lug 62 is carried by the housing 16 and also serves as an abutment or stop for the vane 50. With this arrangement the wind wheel under normal operating conditions will be maintained head in the wind which is the operative position of the wind wheel. Should the velocity of the wind increase to such an extent as to set up a too rapid rotation of the wheel and consequently a too rapid movement of the other parts of the mechanism, the wheel will swing around on its axis, the spring 60 yielding to permit this action. The swinging movement of the wheel carries it around out of the wind and into inoperative position. With the arrangement described, that is with the pivotal connection of the vanes to the housing located half way between the axis of rotation of the shaft 30 and the axis of swing of the housing, the wind wheel and of course the housing swing smoothly and gradually from operative position to inoperative position and the parts are not subjected to sudden shocks, jerks or strains.

In order to provide for the movement of the wind wheel to inoperative position, under normal operating conditions, an arm 70 is connected with the vane adjacent the lower portion thereof and in a plane below the bottom of the housing 16. To the outer end of this arm 70 one end of a chain 71 or a similar connecting element is secured. This chain 71 is then trained over a pulley 72 rotatably mounted in suitable bearings provided therefor immediately below the housing 16. The chain 71 after leaving the pulley 72 is extended down through the tubular member 11 to a point where it may be conveniently operated. This arrangement disposes the parts in a position where they will be out of the way and protected and yet enhances the ease with which the wheel may be swung around to inoperative position.

In operation, the motion of the wheel is transmitted smoothly and evenly to the pump rod and none of the elements of the mechanism is subjected to jerks, sudden shocks or strains. At the same time the means employed is extremely simple in its construction and is adapted for manufacture at a comparatively slight expense from materials and by means of facilities ordinarily available. At the same time an ample degree of power is applied to the pump rod. Since the parts of the mechanism are entirely housed and protected and operate in a bath of oil the life of the wind mill is prolonged and the efficiency of the parts of the wind mill preserved.

The automatic control of the wind mill is improved and rendered so smooth and gradual in its action and yet so certain and reliable that a uniform operation is had and all liability of sudden and injurious movements is precluded. The manual control has also been improved and simplified in the manner described.

I claim:

1. In a device of the character described, a housing having a horizontally disposed bearing extending from one side thereof, a horizontal shaft rotatably mounted in said bearing, an actuating member fixed to the outer end of said shaft, a cam fixed to the inner end of the shaft and operating in the housing, said cam having a double groove in its exposed face, a lever having one end fulcrumed on the housing for vertical swinging movement about a horizontal axis, the other end of the lever being adapted for connection with a pump rod, and a follower operating in the grooves of the cam and pivotally connected to the lever intermediate its ends.

2. In a device of the character described, a horizontal rotatable shaft, an actuating member fixed to one end of said shaft, a cam fixed to the other end of said shaft and having a double groove in its exposed lateral face, a lever having one end fulcrumed on a horizontal axis and having its other end adapted for connection with a pump rod, said lever being swingable in a vertical plane slightly spaced from and parallel to the exposed face of said cam, and a follower operating in the grooves of the cam and pivotally connected to the lever intermediate its ends.

3. In a device of the character described, a rotatable shaft, an actuating member thereon, a cam fixed to the shaft and having a grooved face, a lever fulcrumed at one end and adapted to be connected to a pump rod at its opposite end, said lever having a series of bearings intermediate its ends, and a follower coacting with the grooved face of the cam and having a stud adapted to be selectively pivoted in any one of the series of the bearings in the lever.

4. In a device of the character described, a housing having a horizontally disposed bearing extending from one side thereof, a horizontal shaft rotatably mounted in said bearing, an actuating member fixed to the outer end of said shaft, a cam fixed to the inner end of the shaft and operating in the housing, said cam being of disk like form, a lever having one end fulcrumed on the housing for vertical swinging movement about a horizontal axis, the other end of the lever being adapted for connection with a pump rod, a follower coacting with the cam and pivotally connected to the lever intermediate its ends, said casing being substantially closed and containing a predetermined level of oil, the cam working in the oil and carrying the same up over the shaft whereby the oil flows out along the shaft to the horizontally disposed bearing, the bearing having an enlargement providing a return chamber for returning the oil to the casing.

5. In a device of the character described, a housing having a horizontally disposed bearing extending from one side thereof, a horizontal shaft rotatably mounted in said bearing, an actuating member fixed to the outer end of said shaft, a cam fixed to the inner end of the shaft and operating in the housing, said cam being of disk-like form, a lever having one end fulcrumed on the housing for vertical swinging movement about a horizontal axis, the other end of the lever being adapted for connection with a pump rod, a follower coacting with the cam and pivotally connected to the lever intermediate its ends, said casing being substantially closed and containing a predetermined level of oil, the cam working in the oil and carrying the same up over the shaft whereby the oil flows out along the shaft to the horizontally disposed bearing, the bearing having an enlargement providing a return chamber for returning the oil to the casing, said bearing and shaft having cooperating means including a spiral groove whereby the oil is fed along the shaft and bearing.

JOHN H. WILSON.